United States Patent
Seki et al.

(10) Patent No.: US 11,181,001 B2
(45) Date of Patent: Nov. 23, 2021

(54) STATOR VANE AND ROTARY MACHINE

(71) Applicant: MITSUBISHI HEAVY INDUSTRIES, LTD., Tokyo (JP)

(72) Inventors: Ryosuke Seki, Tokyo (JP); Koichiro Iida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 75 days.

(21) Appl. No.: 16/747,952

(22) Filed: Jan. 21, 2020

(65) Prior Publication Data
US 2020/0271005 A1  Aug. 27, 2020

(30) Foreign Application Priority Data
Feb. 22, 2019  (JP) .............................. JP2019-030920

(51) Int. Cl.
*F01D 9/04* (2006.01)
*F01D 25/24* (2006.01)

(52) U.S. Cl.
CPC .............. *F01D 9/041* (2013.01); *F01D 25/24* (2013.01); *F05D 2240/12* (2013.01); *F05D 2240/60* (2013.01)

(58) Field of Classification Search
CPC .......... F01D 9/041; F01D 9/042; F01D 9/065; F01D 25/24; F05D 2240/12; F05D 2240/60
See application file for complete search history.

(56) References Cited

U.S. PATENT DOCUMENTS

| | | | |
|---|---|---|---|
| 4,962,640 A * | 10/1990 | Tobery | F01D 5/189 60/782 |
| 5,488,825 A * | 2/1996 | Davis | F01D 5/187 415/115 |
| 5,562,404 A | 10/1996 | Koff et al. | |
| 6,357,999 B1 * | 3/2002 | Pearce | F01D 5/187 415/115 |
| 6,761,529 B2 * | 7/2004 | Soechting | F01D 5/187 415/115 |
| 9,631,515 B2 * | 4/2017 | Oyarbide | F01D 11/001 |
| 2017/0030210 A1 * | 2/2017 | Oyarbide | F01D 5/082 |
| 2017/0198596 A1 * | 7/2017 | Granberg | F01D 5/02 |
| 2017/0234155 A1 * | 8/2017 | Lipinski | F01D 11/005 415/1 |
| 2018/0298770 A1 * | 10/2018 | Devore | F01D 9/065 |
| 2019/0211698 A1 * | 7/2019 | Kim | F01D 9/065 |
| 2020/0271005 A1 * | 8/2020 | Seki | F01D 9/041 |

FOREIGN PATENT DOCUMENTS

JP  05-032738  4/1993

\* cited by examiner

*Primary Examiner* — Igor Kershteyn
(74) *Attorney, Agent, or Firm* — Wenderoth, Lind & Ponack, L.L.P.

(57) ABSTRACT

A stator vane is configured to guide a flow of a fluid flowing in an axial direction. The stator vane includes a stator vane body which extends in a radial direction with respect to an axis and includes a radially outer end portion which is supported by a casing and a stator vane inner circumferential surface which is an end surface facing an inside in the radial direction and faces an outer peripheral surface of a rotary shaft via a clearance, and an internal channel which is defined inside the stator vane body and includes a first end which is open on the stator vane inner circumferential surface and a second end which is connected to a pressure source having a pressure different from a pressure around the stator vane body.

16 Claims, 5 Drawing Sheets

STATOR VANE AND ROTARY MACHINE

CROSS-REFERENCE TO RELATED APPLICATION

Priority is claimed from Japanese Patent Application No. 2019-030920, filed on Feb. 22, 2019, the content of which is incorporated herein by reference.

BACKGROUND OF THE INVENTION

Field of the Invention

The present invention relates to a stator vane and a rotary machine.

Description of Related Art

In general, a gas turbine includes a compressor, a combustor, and a turbine. The compressor compresses outside air to generate high-pressure air. The combustor mixes a fuel with the high-pressure air and combusts the mixture to generate a high-temperature and high-pressure combustion gas. The turbine is rotationally driven by the combustion gas. Rotational energy of the turbine is extracted from a shaft end and used for various purposes.

The compressor has a rotary shaft, a rotor blade row which is provided on an outer peripheral surface of the rotary shaft, and a stator vane row which is provided on an inner circumferential surface of a casing. A plurality of the rotor blade rows and a plurality of the stator vane rows are alternately provided in an axial direction of the rotary shaft. Each stator vane row has a plurality of stator vanes which is arranged in a circumferential direction with respect to an axis on an inner circumferential surface of the casing. As a method for supporting the stator vanes on the inner circumferential surface of the casing, a method called a cantilever type is known. In this type of stator vane, only a radially outer end portion of the stator vane is cantilevered on the inner circumferential surface of the casing. A radially inner end surface of the stator vane faces the outer peripheral surface of the rotary shaft via a clearance.

In the stator vane, a high pressure-side surface (a surface facing an upstream side) is a concave ventral surface, and a low pressure-side surface (a surface facing a downstream side) is a convex back surface. When a fluid collides from an upstream side toward the stator vane, a flow direction of the fluid is changed along the ventral surface and the back surface. However, a separation of the flow may occur on a back side having a convex shape. If the separation occurs, an operation of the compressor is unstable. Accordingly, like a stator vane described in Japanese Unexamined Utility Model Application, First Publication No. H5-32738, a structure having an internal channel which is open to a back surface is known. Air is sucked from an opening of the back surface, and thus, a flow of a fluid can come into close contact with the back surface.

SUMMARY OF THE INVENTION

In a cantilever type stator vane, a clearance is formed between an outer peripheral surface of the rotary shaft and the stator vane. In this case, a leakage flow may be generated from a ventral side toward a back side through the clearance by a pressure difference between a back surface side and a ventral surface side of the stator vane. This leakage flow is mixed with a main flow (flow flowing in the axial direction with respect to the stator vane), which may cause a pressure loss. In particular, in the stator vane described in Japanese Unexamined Utility Model Application, First Publication No. H5-32738, a configuration in which a fluid is sucked from the back surface side of the stator vane is adopted. Accordingly, there is a possibility that the leakage flow from the ventral surface side toward the back surface side may frequently occur.

The present invention provides a stator vane and a rotating machine capable of further decreasing the leakage flow.

According to an aspect of the present invention, there is provided a stator vane which guides a flow of a fluid flowing in an axial direction, the stator vane including: a stator vane body which extends in a radial direction with respect to an axis and includes a radially outer end portion which is supported by a casing and a stator vane inner circumferential surface which is an end surface facing an inside in the radial direction and configured to face an outer peripheral surface of a rotary shaft via a clearance; and at least one internal channel which is formed inside the stator vane body and includes a first end which is open on the stator vane inner circumferential surface and a second end which is configured to connect to a pressure source having a pressure different from a pressure around the stator vane body.

According to the configuration, the internal channel is formed inside the stator vane body. The first end of the internal channel is open on the inner circumferential surface (stator vane inner circumferential surface) of the stator vane body, and the second end thereof is connected to the pressure source. The pressure of the pressure source is different from the pressure around the stator vane body. Therefore, a pressure difference is generated between the pressure source and the surroundings of the stator vane body, and a fluid flow is generated in the internal channel based on the pressure difference. Here, in a case where the pressure of the pressure source is higher than the pressure around the stator vane body, the flow of the fluid is generated in a direction from the pressure source toward the stator vane body. That is, the fluid blows out from the inner circumferential surface of the stator vane body through first end of the internal channel. However, in a case where the pressure of the pressure source is lower than the pressure around the stator vane body, the flow of the fluid is generated in a direction from the stator vane body toward the pressure source. That is, the fluid is sucked from the inner circumferential surface of the stator vane body through first end of the internal channel. Here, in a cantilever type stator vane, the clearance is formed between the outer peripheral surface of the rotary shaft and the stator vane. In this case, a leakage flow may be generated from a ventral side toward a back side of the stator vane through the clearance due to a pressure difference between the back surface side and the ventral surface side of the stator vane. This leakage flow is mixed with a main flow (flow flowing in the axial direction with respect to the stator vane), which may cause a pressure loss. However, according to the configuration, the leakage flow through the clearance can be blown away or sucked by the internal channel. As a result, the leakage flow is reduced, and the pressure loss can be suppressed.

In the stator vane, the stator vane body may have an airfoil shape in which an end edge on a first side in the axial direction is a leading edge and an end edge on a second side in the axial direction is a trailing edge, and the first end of the at least one internal channel may be open at a position close to the leading edge in the stator vane inner circumferential surface.

According to the configuration, the first end of the internal channel is open at the position biased toward the leading edge side in the stator vane inner circumferential surface. Therefore, even when the leakage flow occurs in the clearance, the leakage flow can be blown away or sucked in at the position biased toward the leading edge side. As a result, the leakage flow does not reach the trailing edge side.

In the stator vane, the stator vane body may have an airfoil shape in which an end edge on a first side in the axial direction is a leading edge and an end edge on a second side in the axial direction is a trailing edge, and the first end of the at least one internal channel may be open at a position close to the trailing edge in the stator vane inner circumferential surface.

According to the configuration, the first end of the internal channel is open at the position biased toward the trailing edge side in the stator vane inner circumferential surface. Here, a separation of the flow may occur on the trailing edge side of the stator vane body. However, according to the configuration, the fluid on the trailing edge side can be blown away or sucked through the internal channel. As a result, the separation of the flow as described above can be suppressed.

In the stator vane, the stator vane body may have an airfoil shape in which an end edge on a first side in the axial direction is a leading edge and an end edge on a second side in the axial direction is a trailing edge, and a plurality of the internal channels may be formed at intervals from the leading edge toward the trailing edge.

According to this configuration, the plurality of internal channels is formed from the leading edge side to the trailing edge side of the stator vane body. Therefore, even when the leakage flow occurs in the clearance, the leakage flow can be uniformly blown away or sucked from the leading edge side to the trailing edge side.

In the stator vane, the at least one internal channel may include an internal channel main portion which is formed in a portion having a largest circumferential dimension with respect to the axis in the stator vane body, and an internal channel tip portion which extends in a direction intersecting the internal channel main portion from a radially inner end portion of the internal channel main portion toward the stator vane inner circumferential surface.

According to the configuration, the internal channel main portion is formed in a portion having a largest circumferential dimension with respect to the axis in the stator vane body, and the internal channel tip portion extends in the direction intersecting the internal channel main portion. Therefore, even when the stator vane body has a small circumferential dimension (that is, when the stator vane body is thin), the internal channel can be reasonably formed inside the stator vane body. Accordingly, it is possible to avoid a decrease in strength of the stator vane body caused by the formation of the internal channel.

According to another aspect of the present invention, there is provided a rotating machine including: a rotary shaft which extends along an axis; a rotor blade row which is provided on an outer peripheral surface of the rotary shaft and has a plurality of rotor blades arranged in a circumferential direction with respect to the axis; a stator vane row which is provided to be adjacent to the rotor blade row in an axial direction and has a plurality of the stator vanes which is arranged in the circumferential direction; and a casing which covers the rotor blade row and the stator vane row from an outer peripheral side and has a plenum serving as the pressure source inside the casing.

According to the configuration, since the flow of the fluid is generated between the plenum serving as the pressure source and the internal channel, the leakage flow through the clearance can be blown away or sucked. For example, in a case where a compressor is applied as the rotating machine, in an upstream stator vane, a pressure in the plenum is higher than a pressure around the stator vane, and thus, the fluid can be blown out through the internal channel. Meanwhile, in a downstream stator vane, the pressure in the plenum is lower than the pressure around the stator vane, and thus, the fluid can be sucked through the internal channel. In this way, the flow is naturally generated in the internal channels from the upstream side to the downstream side by using the plenum serving as a single pressure source. Accordingly, the leakage flow can be suppressed in a wider range.

According to the present invention, it is possible to provide the stator vane and the rotating machine capable of further decreasing the leakage flow.

DETAILED DESCRIPTION OF THE INVENTION

First Embodiment

A first embodiment of the present invention will be described with reference to FIGS. 1 to 4. A gas turbine 100 according to the present embodiment includes a compressor 1 (rotating machine), a combustor 3, and a turbine 2. The compressor 1 compresses air from an outside to generate a high-pressure air. The combustor 3 mixes a fuel with the high-pressure air and combusts the mixture to generate a high-temperature and high-pressure combustion gas. The turbine 2 is rotationally driven by the combustion gas. A rotating force of the turbine 2 is extracted from a shaft end and used for various purposes.

Figure 1:
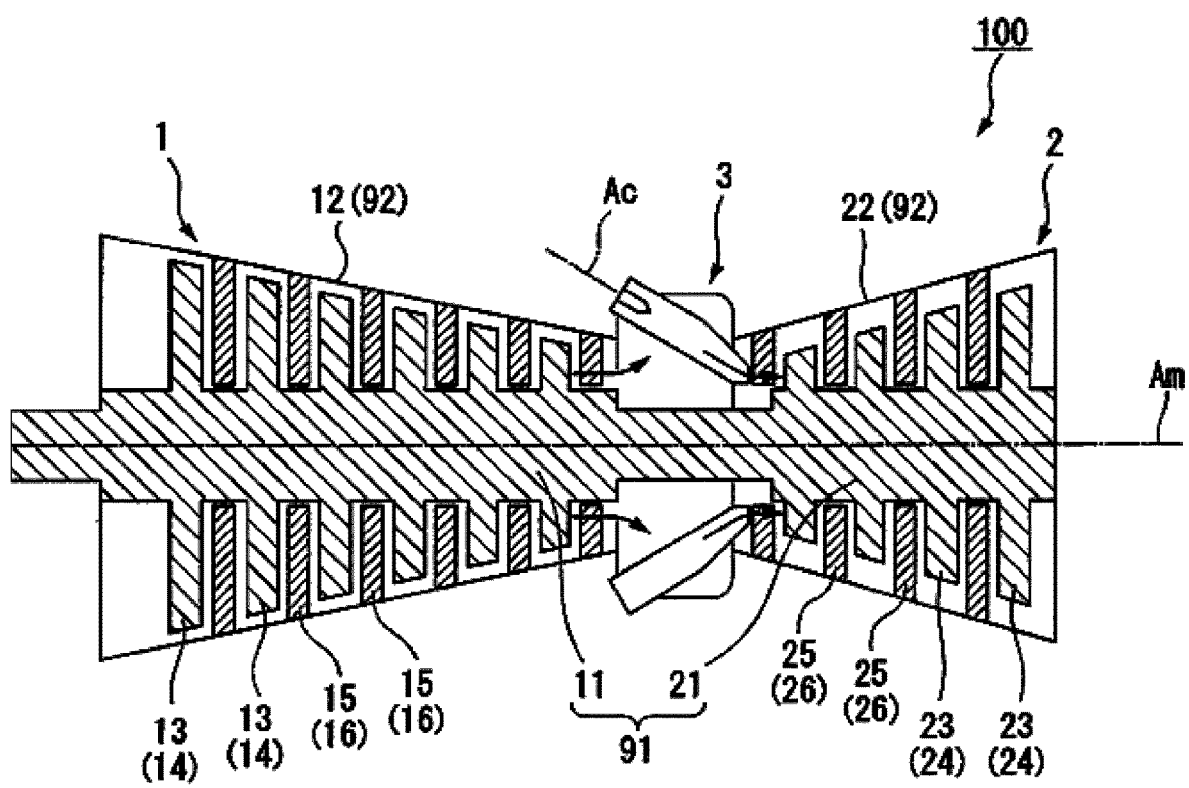
FIG. 1 is a schematic diagram showing a configuration of a gas turbine according to a first embodiment of the present invention.

As shown in FIG. 1, the compressor 1 has a compressor rotor 11 (rotary shaft) which extends in an axis Am, a compressor casing 12, compressor rotor blade rows 13, and compressor stator vane rows 15. The compressor rotor 11 has a columnar shape centered on the axis Am and can rotate around the axis Am. A plurality of the compressor rotor blade rows 13 is provided on an outer peripheral surface of the compressor rotor 11 at intervals in an axis Am direction. Each compressor rotor blade row 13 has a plurality of compressor rotor blades 14 arranged at intervals in a circumferential direction with respect to the axis Am.

The compressor casing 12 covers the compressor rotor 11 and the compressor rotor blade rows 13 from an outer peripheral side. The compressor casing 12 has a cylindrical shape centered on the axis Am. In an inner circumferential surface of the compressor casing 12, the above-described compressor rotor blade rows 13 and a plurality of the compressor stator vane rows 15 are provided alternately in the axis Am direction. Each compressor stator vane row 15 has a plurality of compressor stator vanes 16 (hereinafter, may be simply referred to as stator vanes 16) arranged in the circumferential direction with respect to the axis Am. A configuration of the stator vane 16 will be described later.

The combustor 3 is provided between the compressor casing 12 and a turbine casing 22 (described later). The combustor 3 has a cylindrical shape extending along a combustor axis Ac extending in a direction intersecting the axis Am. Although not shown in detail, a fuel nozzle which injects a fuel into the high-pressure air generated by the compressor 1 is provided inside the combustor 3.

The turbine 2 includes a turbine rotor 21, a turbine casing 22, turbine rotor blade rows 23, and turbine stator vane rows 25. The turbine rotor 21 has a columnar shape extending along the axis Am. The turbine rotor 21 can rotate around the axis Am. A plurality of the turbine rotor blade rows 23 is provided on an outer peripheral surface of the turbine rotor 21 at intervals in the axis Am direction. Each turbine rotor blade row 23 has a plurality of turbine rotor blades 24 arranged at intervals in a circumferential direction with respect to the axis Am.

The turbine casing 22 covers the turbine rotor 21 and the turbine rotor blade rows 23 from an outer peripheral side. The turbine casing 22 has a cylindrical shape centered on the axis Am. In an inner circumferential surface of the turbine casing 22, the above-described turbine rotor blade rows 23 and a plurality of the turbine stator vane rows 25 are provided alternately in the axis Am direction. Each turbine stator vane row 25 has a plurality of turbine stator vanes 26 arranged in the circumferential direction with respect to the axis Am.

The compressor rotor 11 and the turbine rotor 21 are integrally connected to each other in the axis Am direction to form a gas turbine rotor 91. The compressor casing 12 and the turbine casing 22 are integrally connected to each other in the axis Am direction to form a gas turbine casing 92. That is, the compressor rotor 11 and the turbine rotor 21 rotate integrally around the axis Am inside the gas turbine casing 92.

In order to operate the gas turbine 100, a rotating force is applied to the gas turbine rotor 91 by a power source (not shown) such as an electric motor. Accordingly, in the compressor 1, the air passing through the compressor rotor blade rows 13 and the compressor stator vane rows 15 is compressed, and high-pressure air is generated. The high-pressure air is mixed with fuel in the combustor 3 provided on the downstream side of the compressor 1 to be combusted. As a result, high-temperature and high-pressure combustion gas is generated. The combustion gas is further fed to the turbine 2 on the downstream side and alternately collides with the turbine rotor blade rows 23 and the turbine stator vane rows 25 inside the turbine 2. As a result, a rotating force is applied to the turbine rotor 21. By repeating this cycle continuously, the gas turbine 100 is operated. The rotating force of the turbine rotor 21 is transmitted to a power generator (not shown) connected to a shaft end and drives the power generator.

Figure 2:
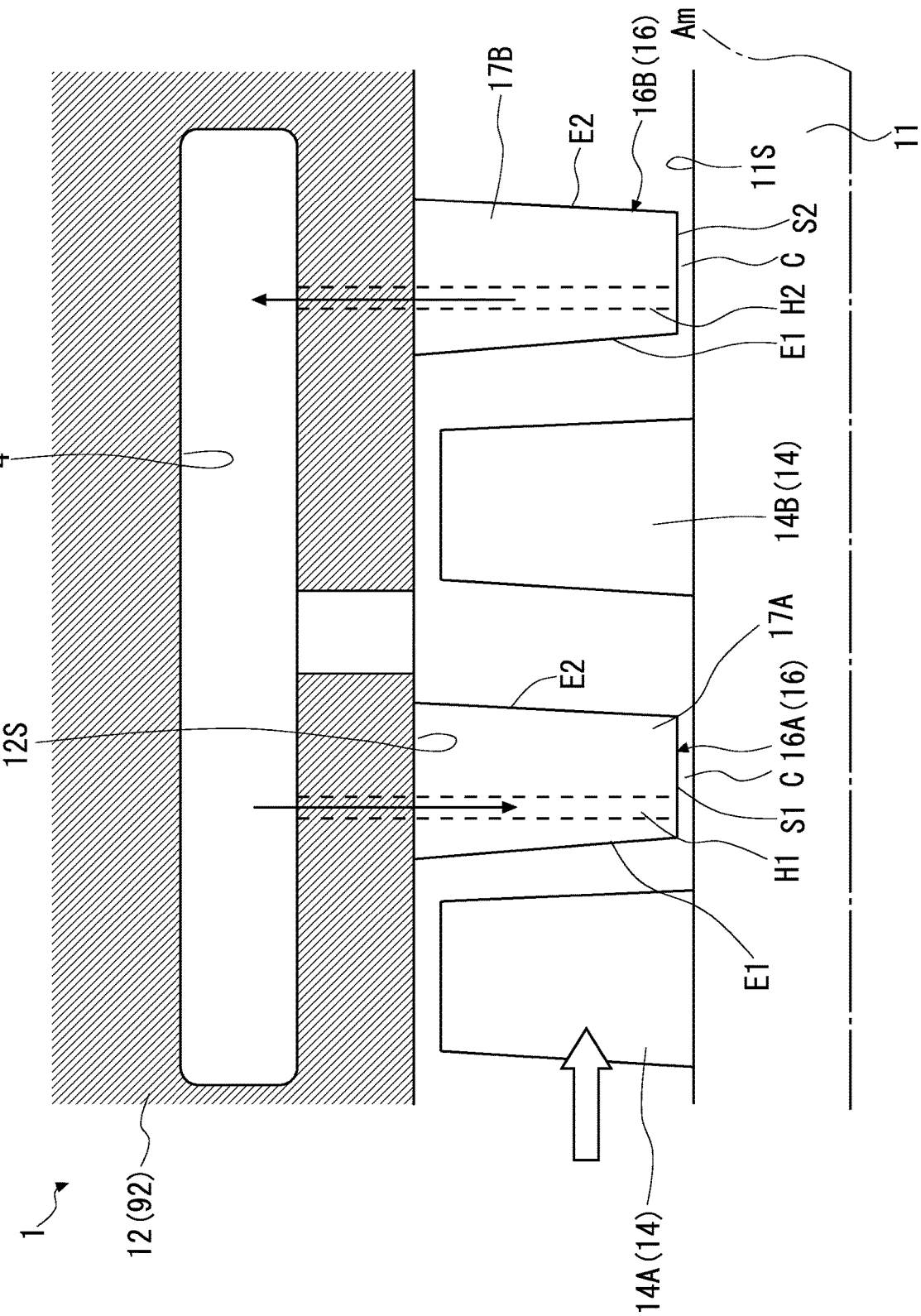
FIG. 2 is an enlarged cross-sectional diagram of a main portion of a compression according to the first embodiment of the present invention.

Next, a configuration of the compressor 1 will be described with reference to FIG. 2. In FIG. 2, in the compressor rotor blades 14 and the compressor stator vanes 16 described above, two compressor rotor blades 14 and two compressor stator vanes 16 (two stages) are shown. Further, the compressor stator vane 16 (stator vane 16) on first side (upstream side) in the axis Am direction is referred to as an upstream stator vane 16A. The compressor stator vane 16 (stator vane 16) on the second side (downstream side) in the axis Am direction is referred to as a downstream stator vane 16B. Similarly, the upstream compressor rotor blade 14 is referred to as an upstream rotor blade 14A. The downstream compressor rotor blade 14 is referred to as a downstream rotor blade 14B.

The upstream stator vane 16A is disposed adjacent to a downstream side of the upstream rotor blade 14A. The upstream stator vane 16A is fixed to the inner circumferential surface of the compressor casing 12. That is, the upstream stator vane 16A is supported in a cantilever shape with respect to the inner circumferential surface of the compressor casing 12. A radially inner end surface (stator vane inner circumferential surface S1) of the upstream stator vane 16A faces a rotor outer circumferential surface 11S through a clearance C. The downstream rotor blade 14B is disposed adjacent to a downstream side of the upstream stator vane 16A.

The downstream stator vane 16B is disposed adjacent to the downstream side of the downstream rotor blade 14B. The downstream stator vane 16B is fixed to the inner circumferential surface of the compressor casing 12. That is, the downstream stator vane 16B is supported in a cantilever shape with respect to the inner circumferential surface of the compressor casing 12. A radially inner end surface (stator vane inner circumferential surface S2) of the downstream stator vane 16B faces the rotor outer circumferential surface 11S via the clearance C.

A plenum 4 is formed inside the compressor casing 12. For example, the plenum 4 is a space into which a fluid extracted from the turbine 2 flows. The plenum 4 extends in the axis Am direction radially outside the upstream rotor blade 14A, the upstream stator vane 16A, the downstream rotor blade 14B, and the downstream stator vane 16B described above.

In the present embodiment, the upstream stator vane 16A has an upstream stator vane body 17A having an airfoil shape when viewed in a radial direction, and an internal channel H1 formed inside the upstream stator vane body 17A. Similarly, the downstream stator vane 16B has a downstream stator vane body 17B having an airfoil-shaped cross section, and an internal channel H2 formed inside the downstream stator vane body 17B. The internal channels H1, H2 communicate with the above-described plenum 4.

Figure 3:
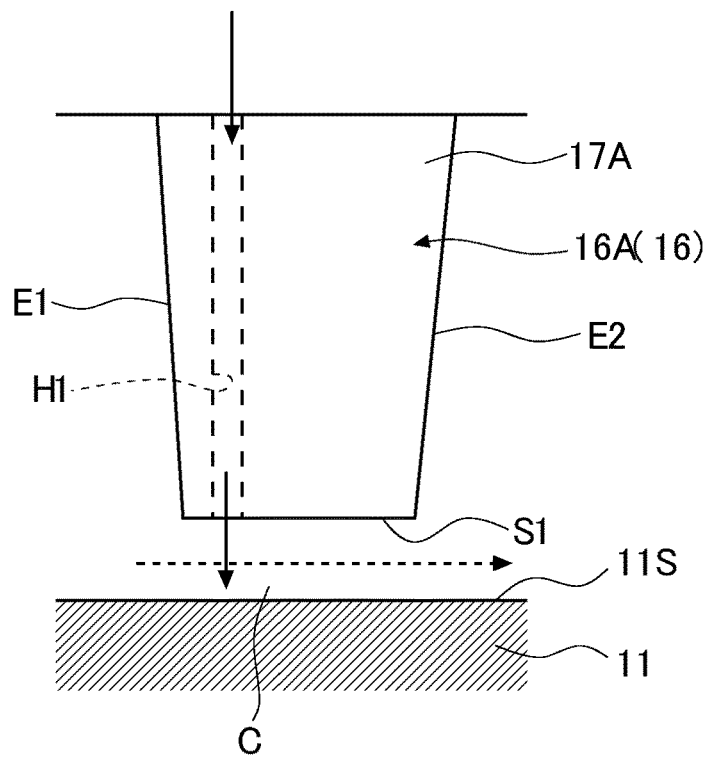
FIG. 3 is an explanatory diagram showing a behavior of an upstream stator vane according to the first embodiment of the present invention.

As shown in FIG. 3, in the upstream stator vane body 17A, an end edge facing the upstream side is a leading edge E1, and an end edge facing the downstream is a trailing edge E2. The internal channel H1 extends in the radial direction with respect to the axis Am, and is formed at a position biased toward the leading edge E1 side in the axis Am direction. Here, the "position biased toward the leading edge E1 side" indicates a position of 0 to 50% from the leading edge E1 in a chord direction of the upstream stator vane body 17A. First end of the internal channel H1 is open on a stator vane inner circumferential surface S1 which is a radially inner end surface of the upstream stator vane body 17A.

Figure 4:
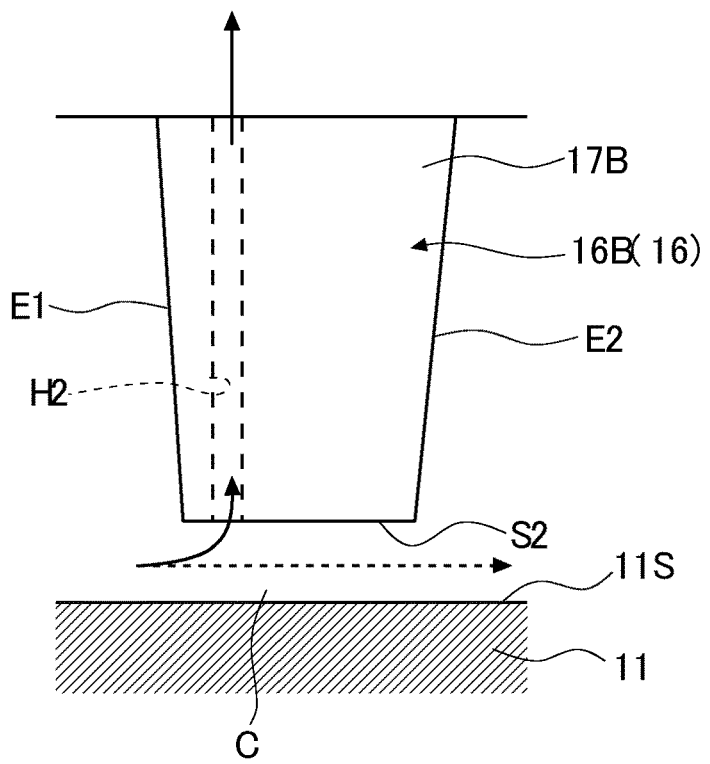
FIG. 4 is an explanatory diagram showing a behavior of a downstream stator vane according to the first embodiment of the present invention.

As shown in FIG. 4, in the downstream stator vane body 17B, the internal channel H2 extends in the axis Am direction and is formed at a position biased toward the leading edge E1 in the axis Am direction. Here, similarly to the above-described internal channel H1, the "position biased toward the leading edge E1 side" indicates a position of 0 to 50% from the leading edge E1 in a chord direction of the downstream stator vane body 17B. First end of the internal channel H2 is open on the stator vane inner circumferential surface S2 which is a radially inner end surface of the downstream stator vane body 17B.

Here, in the cantilever type stator vane 16 as described above, the clearance C is formed between the stator vane 16 and the outer peripheral surface (the rotor outer circumferential surface 11S) of the compressor rotor 11. In this case, a leakage flow from a back surface side to a ventral surface side of the stator vane 16 toward the back side may occur through the clearance C due to a pressure difference between the back surface side and the ventral surface side of the stator vane 16. When this leakage flow is mixed with a main flow (flow flowing in the axis Am direction with respect to the stator vane 16), a pressure loss may occur.

However, according to the above-described configuration, the internal channels H1 and H2 are formed inside the stator vane 16. First end of each of the internal channels H1 and H2 is open on the inner circumferential surface (stator vane inner circumferential surfaces S1 and S2) of the stator vane 16, and the second end is connected to the plenum 4 serving as a pressure source. A pressure in the plenum 4 is different from a pressure around the stator vane 16. Therefore, a pressure difference is generated between the plenum 4 and the surroundings of the stator vane 16, and a fluid flow is generated in the internal channels H1 and H2 based on the pressure difference. Here, the pressure of the fluid around the stator vane 16 increases as it goes from the upstream stator vane 16A toward the downstream stator vane 16B. That is, the pressure around the upstream stator vane 16A is lower than the pressure in the plenum 4, and the pressure around the downstream stator vane 16B is higher than the pressure in the plenum 4.

Therefore, when the pressure in the plenum 4 is higher than the pressure around the stator vane 16, the fluid flows in a direction from the plenum 4 toward the stator vane 16. That is, the fluid blows out from the stator vane inner circumferential surface S1 through first end of the internal channel H1 of the upstream stator vane 16A. When the pressure in the plenum 4 is lower than the pressure around the stator vane 16, the fluid flows in the direction from the stator vane 16 toward the plenum 4. That is, the fluid is sucked from the stator vane inner circumferential surface S2 through first end of the internal channel H2. Accordingly, the leakage flow through the clearance C can be blown away or sucked by the internal channels H1 and H2. As a result, the leakage flow is reduced, and the pressure loss generated around the stator vane 16 can be suppressed.

Furthermore, according to the above-described configuration, in each of the stator vane inner circumferential surfaces S1 and S2, the first end of each of the internal channels H1 and H2 is open at the position biased toward the leading edge E1 side. Therefore, even when the leakage flow occurs in the clearance C, the leakage flow can be blown away or sucked in at the position biased toward the leading edge E1 side. As a result, the leakage flow does not reach the trailing edge side. Accordingly, the pressure loss can be further reduced.

In addition, according to the above-described configuration, the flow is naturally generated in the internal channels H1 and H2 from the upstream side to the downstream side by using the plenum 4 serving as a single pressure source. Accordingly, the leakage flow can be suppressed in a wider range.

Hereinbefore, the first embodiment of the present invention is described. Moreover, various changes and modifications can be applied to the above-described configuration without departing from the gist of the present invention.

Second Embodiment

Figure 5:
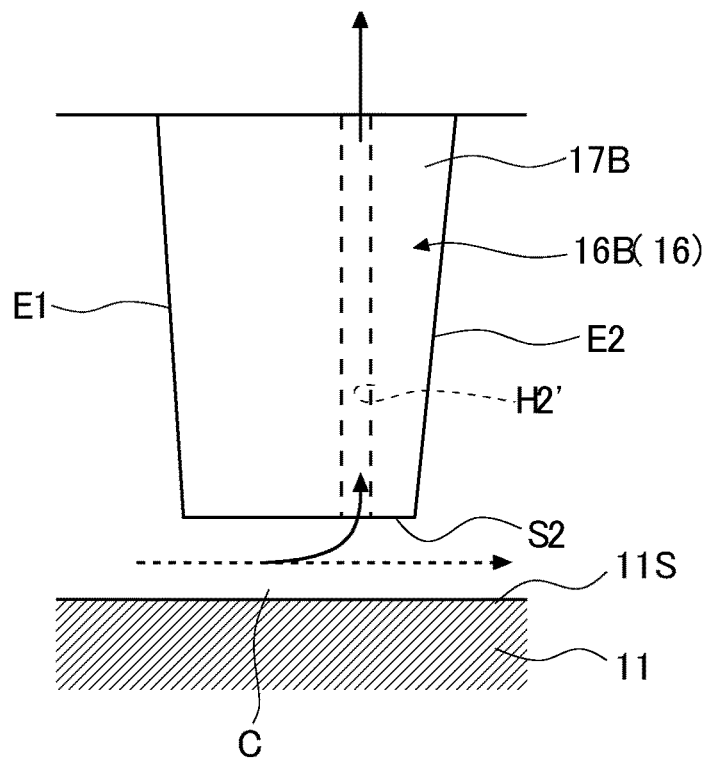
FIG. 5 is an explanatory diagram showing a behavior of a downstream stator vane according to a second embodiment of the present invention.

Next, a second embodiment of the present invention will be described with reference to FIG. 5. Moreover, the same references are assigned to the same configurations as those of the first embodiment, and detailed descriptions thereof are omitted. Moreover, in FIG. 5, only the downstream stator vane 16B of the above-described upstream stator vane 16A and downstream stator vane 16B is described as an example. However, a configuration according to the present embodiment can be also applied to the upstream stator vane 16A.

In the present embodiment, a position of an internal channel H2' in the downstream stator vane 16B is different from that in the first embodiment. That is, the internal channel H2' is formed at a position biased toward the trailing edge E2 side of the downstream stator vane body 17B. Here, the "position biased toward the trailing edge E2 side" indicates a position of 50 to 100% from the leading edge E1 in a chord direction of the downstream stator vane body 17B. Moreover, in the present embodiment, the internal channel H2' extends in the radial direction with respect to the axis Am.

According to the above-described configuration, in the stator vane inner circumferential surface S2, first end of the internal channel H2' is open at the position biased toward the trailing edge E2 side. Here, a separation of the flow may occur on the trailing edge E2 side of the stator vane 16. However, according to the above-described configuration, the fluid on the trailing edge E2 side can be blown away or sucked through the internal channel H2'. In the example of FIG. 5, the state where the fluid on the trailing edge E2 side is sucked by the internal channel H2' is shown. As a result, the separation of the flow as described above can be suppressed.

Hereinbefore, the second embodiment of the present invention is described. Moreover, various changes and modifications can be applied to the above-described configuration without departing from the gist of the present invention.

Third Embodiment

Figure 6:
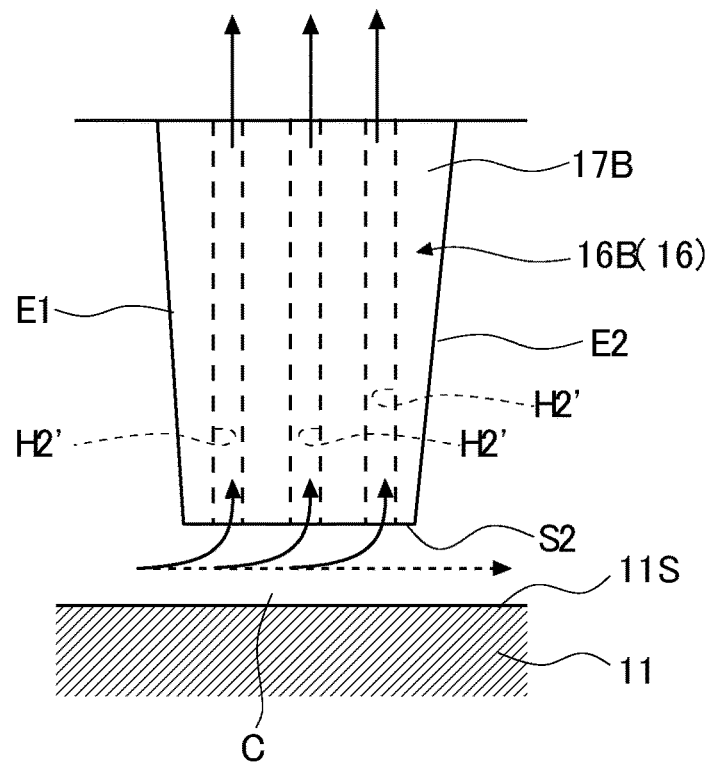
FIG. 6 is an explanatory diagram showing a behavior of a downstream stator vane according to a third embodiment of the present invention.

Subsequently, a third embodiment of the present invention will be described with reference to FIG. 6. Moreover, the same references are assigned to the same configurations as those of the above-described embodiments, and detailed descriptions thereof are omitted. Moreover, in an example of FIG. 6, only the downstream stator vane 16B of the above-described upstream stator vane 16A and downstream stator vane 16B is described as an example. However, a configuration according to the present embodiment can be also applied to the upstream stator vane 16A.

In the present embodiment, a plurality (three) of the internal channels H2' are formed at intervals from the leading edge E1 side to the trailing edge E2 side. Any internal channel H2' extends in the radial direction with respect to the axis Am. That is, first end of each of the three internal channels H2' is open on the stator vane inner circumferential surface S2 from the leading edge E1 side to the trailing edge E2 side.

According to the above-described configuration, the plurality of internal channels H2' is formed from the leading edge E1 side to the trailing edge E2 side of the stator vane 16. Therefore, even when the leakage flow occurs in the clearance C, the leakage flow can be uniformly blown away or sucked from the leading edge E1 side to the trailing edge E2 side.

Hereinbefore, the third embodiment of the present invention is described. Moreover, various changes and modifications can be applied to the above-described configuration without departing from the gist of the present invention.

Fourth Embodiment

Figure 7:
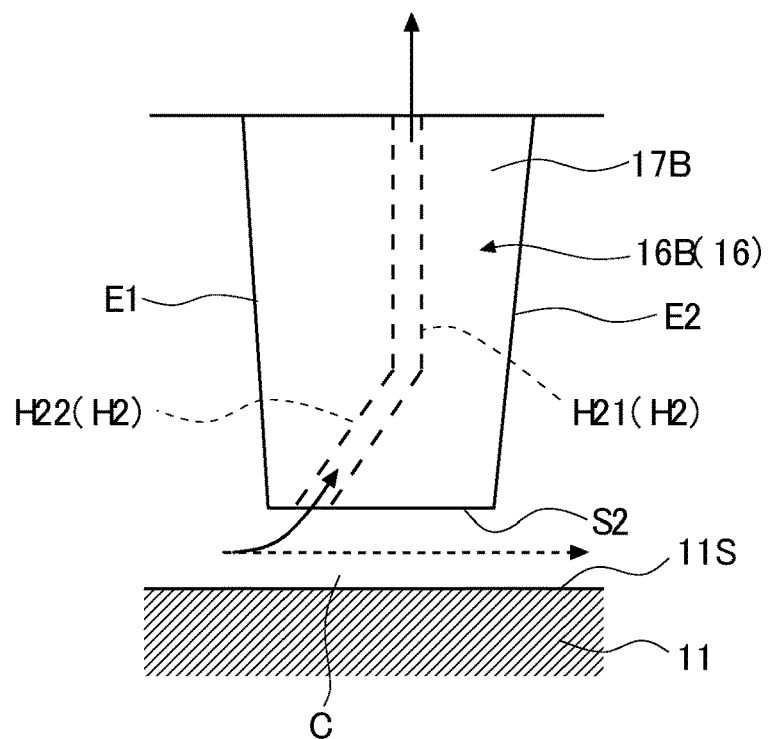
FIG. 7 is an explanatory diagram showing a behavior of a downstream stator vane according to a fourth embodiment of the present invention.

Next, a fourth embodiment of the present invention will be described with reference to FIG. 7. In addition, the same references are assigned to the same configurations as those of the embodiments, and detailed descriptions thereof are omitted. Moreover, in an example of FIG. 7, only the downstream stator vane 16B of the above-described upstream stator vane 16A and downstream stator vane 16B is described as an example. However, a configuration according to the present embodiment can be also applied to the upstream stator vane 16A.

In the present embodiment, the internal channel H2 includes an internal channel main portion H21 and an internal channel tip portion H22. The internal channel main portion H21 passes through the portion having the largest blade thickness in the downstream stator vane body 17B. The "portion having the largest blade thickness" refers to a portion having the largest dimension in the circumferential direction with respect to the axis Am. The internal channel tip portion H22 extends in a direction intersecting the internal channel main portion H21 from a radially inner end portion of the internal channel main portion H21 toward the stator vane inner circumferential surface S2. More specifically, the internal channel tip portion H22 extends obliquely from the radially inner end portion of the internal channel main portion H21 toward the leading edge E1 side. Accordingly, first end of the internal channel H2 is opened at a position biased toward the leading edge E1 side on the stator vane inner circumferential surface S2. Moreover, similarly the first embodiment, the "position biased toward the leading edge E1 side" indicates a position of 0 to 50% from the leading edge E1 in the chord direction of the downstream stator vane body 17B.

According to the above-described configuration, the internal channel main portion H21 is formed in the portion having the largest circumferential dimension in the downstream stator vane body 17B, and the internal channel tip portion H22 extends in the direction intersecting the internal channel main portion H21. Therefore, even when the downstream stator vane body 17B has a small circumferential dimension (that is, when the blade thickness is thin), the internal channel H2 can be reasonably formed inside the downstream stator vane 16B. Accordingly, it is possible to avoid a decrease in strength of the stator vane 16 caused by the formation of the internal channel H2.

Figure 8:
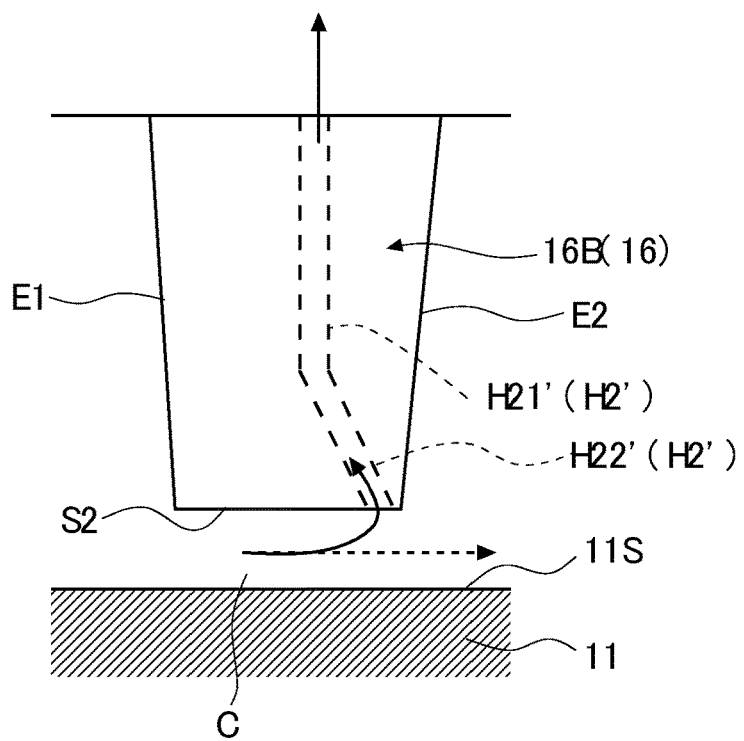
FIG. 8 is an explanatory diagram showing a modification example of the downstream stator vane according to the fourth embodiment of the present invention.

Hereinbefore, the fourth embodiment of the present invention is described. Moreover, various changes and modifications can be applied to the above-described configuration without departing from the gist of the present invention. For example, in the fourth embodiment, the example in which the internal channel tip portion H22 extends obliquely toward the leading edge E1 side is described. However, an aspect of the internal channel tip portion H22 is not limited to the above-described aspect, and a configuration shown in FIG. 8 can be adopted as another example. In an example shown in FIG. 8, the internal channel H2' includes an internal channel main portion H21' extending in a radial direction with respect to the axis Am, and an internal channel tip portion H22' which extends obliquely from a radially inner end portion of the internal channel main portion H21' toward the trailing edge E2 side. Accordingly this configuration, the same effects as described above can be obtained.

EXPLANATION OF REFERENCES

100: gas turbine
1: compressor
2: turbine
3: combustor
4: plenum (pressure source)
11: compressor rotor
11S: rotor outer circumferential surface
12: compressor casing
12S: inner circumferential surface
13: compressor rotor blade row
14: compressor rotor blade
14A: upstream rotor blade
14B: downstream rotor blade
15: compressor stator vane row
16: compressor stator vane (stator vane)
16A: upstream stator vane
16B: downstream stator vane
17A: upstream stator vane body
17B: downstream stator vane body
21: turbine rotor
22: turbine casing
23: turbine rotor blade row
24: turbine rotor blade
25: turbine stator vane row
26: turbine stator vane
91: gas turbine rotor
92: gas turbine casing
Ac: combustor axis
Am: axis
C: clearance
E1: leading edge
E2: trailing edge
H1, H2, H2': internal channel
H21, H21': internal channel main portion
H22, H22': internal channel tip portion
S1, S2: stator vane inner circumferential surface

What is claimed is:

1. A stator vane for guiding a flow of a fluid flowing in an axial direction, the stator vane comprising:
a stator vane body which extends in a radial direction with respect to an axis and includes a radially outer end portion and a stator vane inner circumferential surface which is an end surface facing an inside in the radial direction and being configured to face an outer peripheral surface of a rotary shaft via a clearance; and at least one internal channel which is defined inside the stator vane body and includes a first end which is open on the stator vane inner circumferential surface and a second end which is configured to connect to a pressure source having a pressure different from a pressure around the stator vane body, wherein:

the stator vane body is configured to be supported by a casing only at the radially outer end portion; and the stator vane inner circumferential surface is located on an innermost portion in the radial direction of the stator vane and is configured to directly face the outer peripheral surface of the rotary shaft such that no other members are present between the stator vane inner circumferential surface and the outer peripheral surface of the rotary shaft.

2. The stator vane according to claim 1, wherein the stator vane body has an airfoil shape in which an end edge on a first side in the axial direction is a leading edge and an end edge on a second side in the axial direction is a trailing edge, and the first end of the at least one internal channel is open at a position adjacent to the trailing edge in the stator vane inner circumferential surface.

3. The stator vane according to claim 1, wherein the stator vane body has an airfoil shape in which an end edge on a first side in the axial direction is a leading edge and an end edge on a second side in the axial direction is a trailing edge, and the at least one internal channel includes a plurality of internal channels defined at intervals from the leading edge toward the trailing edge.

4. The stator vane according to claim 1, wherein the at least one internal channel includes an internal channel main portion which is defined in a portion having a largest circumferential dimension with respect to the axis in the stator vane body, and an internal channel tip portion which extends in a direction intersecting the internal channel main portion from a radially inner end portion of the internal channel main portion toward the stator vane inner circumferential surface.

5. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 1 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

6. The stator vane according to claim 2, wherein the at least one internal channel includes an internal channel main portion which is defined in a portion having a largest circumferential dimension with respect to the axis in the stator vane body, and an internal channel tip portion which extends in a direction intersecting the internal channel main portion from a radially inner end portion of the internal channel main portion toward the stator vane inner circumferential surface.

7. The stator vane according to claim 3, wherein the at least one internal channel includes an internal channel main portion which is defined in a portion having a largest circumferential dimension with respect to the axis in the stator vane body, and an internal channel tip portion which extends in a direction intersecting the internal channel main portion from a radially inner end portion of the internal channel main portion toward the stator vane inner circumferential surface.

8. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 2 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

9. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 3 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

10. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 4 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

11. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 6 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

12. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 7 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

13. The stator vane according to claim 1, wherein the stator vane body has an airfoil shape in which an end edge on a first side in the axial direction is a leading edge and an end edge on a second side in the axial direction is a trailing edge, and the first end of the at least one internal channel is open at a position adjacent to the leading edge in the stator vane inner circumferential surface.

14. The stator vane according to claim 13, wherein the at least one internal channel includes an internal channel main portion which is defined in a portion having a largest circumferential dimension with respect to the axis in the stator vane body, and an internal channel tip portion which extends in a direction intersecting the internal channel main portion from a radially inner end portion of the internal channel main portion toward the stator vane inner circumferential surface.

15. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 13 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

16. A rotary machine comprising:

a rotary shaft which extends along an axis;

a rotor blade row which is on an outer peripheral surface of the rotary shaft and has a plurality of rotor blades arranged in a circumferential direction with respect to the axis;

a stator vane row which has a plurality of the stator vanes according to claim 14 arranged in the circumferential direction such that the plurality of rotor blades and the plurality of stator vanes alternate in an axial direction; and a casing which covers the rotor blade row and the stator vane row from an outer peripheral side and has a plenum which is the pressure source inside the casing.

* * * * *